(12) United States Patent
Arbel

(10) Patent No.: US 10,026,267 B2
(45) Date of Patent: Jul. 17, 2018

(54) IN-GAME SPORTS PREDICTION BETTING SYSTEM

(71) Applicant: Itai Arbel, Tel Aviv (IL)

(72) Inventor: Itai Arbel, Tel Aviv (IL)

(73) Assignee: Synced Apps Technologies Ltd., Tel Aviv (IL)

(*) Notice: Subject to any disclaimer, the term of this patent is extended or adjusted under 35 U.S.C. 154(b) by 0 days.

(21) Appl. No.: 15/038,605

(22) PCT Filed: Sep. 21, 2014

(86) PCT No.: PCT/IB2014/064709
§ 371 (c)(1),
(2) Date: May 23, 2016

(87) PCT Pub. No.: WO2015/075574
PCT Pub. Date: May 28, 2015

(65) Prior Publication Data
US 2016/0300451 A1 Oct. 13, 2016

Related U.S. Application Data

(60) Provisional application No. 61/909,434, filed on Nov. 27, 2013.

(51) Int. Cl.
*G07F 17/32* (2006.01)
*G06Q 50/34* (2012.01)
*G06Q 10/04* (2012.01)

(52) U.S. Cl.
CPC ......... *G07F 17/3288* (2013.01); *G06Q 10/04* (2013.01); *G06Q 50/34* (2013.01); *G07F 17/3262* (2013.01)

(58) Field of Classification Search
CPC ....................................................... G07F 17/32
See application file for complete search history.

(56) References Cited

U.S. PATENT DOCUMENTS

2005/0227757 A1  10/2005  Simon
2010/0056241 A1*  3/2010  Acres .................... G07F 17/32
                                                                463/13

FOREIGN PATENT DOCUMENTS

WO  2012088540 A1  6/2012
WO  2013132293 A1  9/2013

* cited by examiner

*Primary Examiner* — Omkar Deodhar
(74) *Attorney, Agent, or Firm* — Gable Gotwals

(57) ABSTRACT

This invention relates to users competing at predicting occurrence that happen during a live sports event. Users buy credits, and enter a betting zone wherein a counter with round points starts to increase. When an incident happens, the users in the betting zone and hold the highest amount of round points wins. Thus, users are encouraged to foresee upcoming occurrence as early as possible, and enter the betting zone so as to gain as many round points as possible.

31 Claims, 3 Drawing Sheets

IN-GAME SPORTS PREDICTION BETTING SYSTEM

CROSS-REFERENCE TO RELATED APPLICATIONS

This U.S. application is the National Phase of PCT Application No. PCT/IB2014/064709 filed 21 Sep. 2014, which claims priority to U.S. Provisional Patent Application No. 61/909,434 filed 23 Nov. 2013, each of which is incorporated herein by reference.

BACKGROUND OF THE INVENTION

The present invention relates to the field of real time sports betting, and audience interaction to any sports game which includes predictable occurrences.

This invention gives sports fans the opportunity to predict occurrences that happen during the event (such as a goal in a soccer match). Many sports fans believe they can predict such occurrence and with this application they can compete with friends and other users who try to do the same.

Currently there are several inventions in the field of real time sports betting. The most relevant to ours are:

WO2012088540A1—a patent application which presents a method that gives sports fans a way to interact during a sports event by betting on sub-events that are being created by an admin and broadcasted to their mobile devices. For example, this application could broadcast a question to the users' devices asking if the player batting in a baseball game will make a home run.

WO2013132293A1—a second patent application presents a method of letting the users predict sub-events during a sports match. In this invention the users predict that an occurrence is going to happen within a predefined time frame. For example, the user presses a button if he believes that a goal is going to happen in the next 30 seconds.

BRIEF SUMMARY OF THE INVENTION

Our invention offers a method to sports fans for predicting pre-defined occurrences during a sports match. The users can click a button and enter the betting zone whenever they feel that the occurrence is about to take place, and leave the betting zone when they feel that the occurrence is no longer about to take place. When a user enters the betting zone (1) his credits decrease constantly; (2) his round points increase constantly; (3) he is in a state of potentially being awarded if an occurrence will actually happen while he is in the betting zone.

TERMS

Occurrence—Occurrences are things that happen during an event. For example: an occurrence can be a goal in a soccer match.

Betting Zone—The Betting zone is the place that the users should be in when an incident happens. Only users that were in the betting zone get rewarded when an occurrence happens. In order to enter the betting zone, the user have to press on a button of the application.

Credits—Credits are being used in order to enter the betting zone. Users can obtain credits either by buying them, or by winning. When users enter the betting zone, their credits decrease constantly. Once out of credit, the users can no longer enter the betting zone.

Round Points—The round point is a parameter that checks who was the first user that forecasted the occurrence. When entering the betting zone, a clock with the users' round points starts to run. If an incident happens, the users that were in the betting zone are being sorted according to the amount of round points that they have, so that the user that has the highest amount of round points gets the first place.

DETAILED DESCRIPTION OF THE INVENTION

This invention is a system that allows people watching a sports match to bet during the matches by predicting the when pre-defined occurrences will happen.

The users predict the occurrences by entering and leaving a betting zone. If an occurrence took place while a user was in the betting zone, he is awarded.

Each user starts the game with a certain amount of credits. Whenever he is in the betting zone, his credits decrease constantly. If the user runs out of credits he can no longer enter the betting zone.

When entering the betting zone, a round points counter starts to increase. If an occurrence happens during that time, the users that were in the betting zone and have the highest amount of round points, win.

If a user who is in the betting zone, feels that the chance for an occurrence to happen is no longer high, he can leave the betting zone and stops losing credits.

The aim of this game is to reward users who are able to recognize a situation that will lead to an occurrence. The game gives incentives to the first users that foresaw an upcoming occurrence, pressed the button and entered the betting zone. The credit limitation encourages the user to enter the betting zone only when he believes that there is a true chance for an occurrence to happen, for otherwise he will run out of credits quickly and won't have a chance to catch other occurrences. For the limitation to be effective, a good amount of credits to play with in a soccer game could be 300 seconds. This amount of time covers 5.6% of the game, as a full game lasts 90 minutes, which equals 5,400 seconds.

The round point mechanism rewards the first users that foresaw the occurrence. Its easy to foresee the occurrence a few seconds before it takes place, but it takes skill, intuition and good knowledge of the game to foresee it earlier.

All the credits that are reduced from the users that enter the betting zone, move to a general pot. Whenever an occurrence takes place and there are winners, the pot is being divided between them, where the users with the highest amount of round points get the highest share from the pot, and so on.

How it Actually Works

The application works on client's devices, such as smartphones, tablets, or any other device that can carry the required software.

The client's devices communicate with a central server that holds all the data.

Whenever a user clicks on a button to enter the betting zone, his device sends a message to the server with all the needed details.

As seen in FIG. 1 the server sends back a message to the client, and on the client's side two counters start counting: one for the round points that starts from zero and increases constantly, and the other for credits that starts from the amount of credits the user had before entering the betting zone and decreases constantly.

As seen in FIG. 2, after entering the betting zone, the client's device shows an option to leave the betting zone. By choosing that option, the client sends a message to the server that contains the details of the betting zone that the user is leaving. After receiving the request to leave the betting zone, the server calculates the remaining credits of the user by comparing the time stamp on the two messages (the one the client sent when entering the betting zone, and the one he sent when leaving it) and sends back to the client the remaining credits. Sometimes, due to connection times, there are going to be differences between the time counted on the client's device to the time counted on the server, and in those cases the user will see its credits counter correcting itself to the number of credits that was sent by the server.

When the server gets a notification of a real occurrence from the actual match, it stores the details in its database and sends a message to all involved clients with the details of the occurrence, and the calculations of earned credits.

The server will do the calculation of the credits and the clients will get a message from the server that contains the details of the occurence, the exact number of credits left for them to play with and the amount of credits that they have earned—all calculated by the server.

The calculation of the remaining credits will be by comparing the time stamp from the messages that were received when the users entered the betting zone to the time stamp of the occurrence.

To calculate the pot, the server accumulates the number of credits that were deducted from users since the last occurrence that had winners. Whenever an occurrence take place, the pot is being cleared and split between the winners.

The credits that are being given to the users as a prize cannot be used to enter the betting zone in the same match—this in order to prevent that the winning users would have an disproportionate amount of credits to play with.

Optional Features

Rooms

The room feature can be added to increase personalization to the game. With this feature, users can choose to play within certain rooms. When a user enters the betting zone within a certain room, his credits move to the personal pot of the room, and the whole competition is happening within the room. Whenever an incident with winners happens, the winners split the pot that was accumulated in their room.

Power

As seen in FIGS. 1 and 2, the power is another optional feature which allows the users to choose "how strong" they want to enter the betting zone. By selecting a power, they choose the speed of their credits decrement and the speed of their round points increment. Users who believes that there is a very good chance for an occurrence to happen, may enter the betting zone with high level of power. This way his round points counter will increase very fast and he will have more round points in a case of an occurrence. The other side of it is that his credits that will decrease faster.

Stop Loss

The stop loss allows the users to limit to the amount of credits they want to spend when they enter the betting zone. For example: a user will be able to choose to leave the betting zone automatically after spending 100 credits.

Multiple Betting Zones

Another way to enrich the game experience is by giving the users several betting options. In soccer for example, users will be able to enter the betting zone of several occurrences such as: goal and corner. If a corner will happen for example, only users that were in the corner's betting zone will get awarded.

Another option is to allow the user to enter two betting zones simultaneously. For example, a user will be allowed to enter the betting zones of goal and corner. If one of those occurrences will happen while the user was in the betting zone of the occurrence that has happened, he will be awarded for it. The credit should decrease faster when a user is in the betting zones of two or more occurrences, and each occurrence should have its own round points counter.

Different occurrence types may have different impact on the speed of round points and credits counters. For example, betting on a corner, which is much more common than a goal, will either cause the credits counter to decrease faster, or the round points counter to increase slower,—or both.

Betting Zones of Players

In this version the user sees betting buttons for each player on the field. The user can choose who will score the next occurrence (goal, basket) by getting into the betting zone of that particular player. The user will have the option to get into the betting zones of several players at a time. Different players will make different impacts on the counters, for example a good player will cause the credits counter to decrease faster, or the round points counter to increase slower, or both.

As seen in FIG. 3, the whole process and steps involved in the invention are:

Step 1 The user waits for something that could indicate that an occurrence is going to happen.

Step 2 The user feels that the occurence is close and presses the button to enter the betting zone. When pressing, a message is sent to the server with the client's details.

Step 3 and 4 When receiving the accept notification from the server, two things happen on the client's device simultaneously: the round points counter starts to increase and the remaining credits start to decrease.

Step 5 The user is now in the betting zone.

There are three ways to leave the betting zone:
(a) Step 6 When the client's remaining credits are finished—he will leave the betting zone automatically.
(b) Step 7 When the occurrence happens—the server sends a message to the clients that the occurrence has happened, and mentions the amount of credits earned and the new amount of remaining credits.
(c) Step 8 When the user believes that the changes for an occurrence to happen are lower and he presses a button to leave the betting zone. A message is being sent to the server, and the server calculates and sends back the amount of the user's remaining credits.

DESCRIPTION OF THE DRAWINGS

Drawing #1—Soccer—Waiting Mode

Drawing #1 presents a Smartphone implementation for soccer. The round points counter (in the bottom with the blue background) shows zero because the user didn't press "Get In" yet and he is not in the betting zone. In the pot there are 27 credits now.

Drawing #2—Soccer—in the Betting Zone

Figure 1:
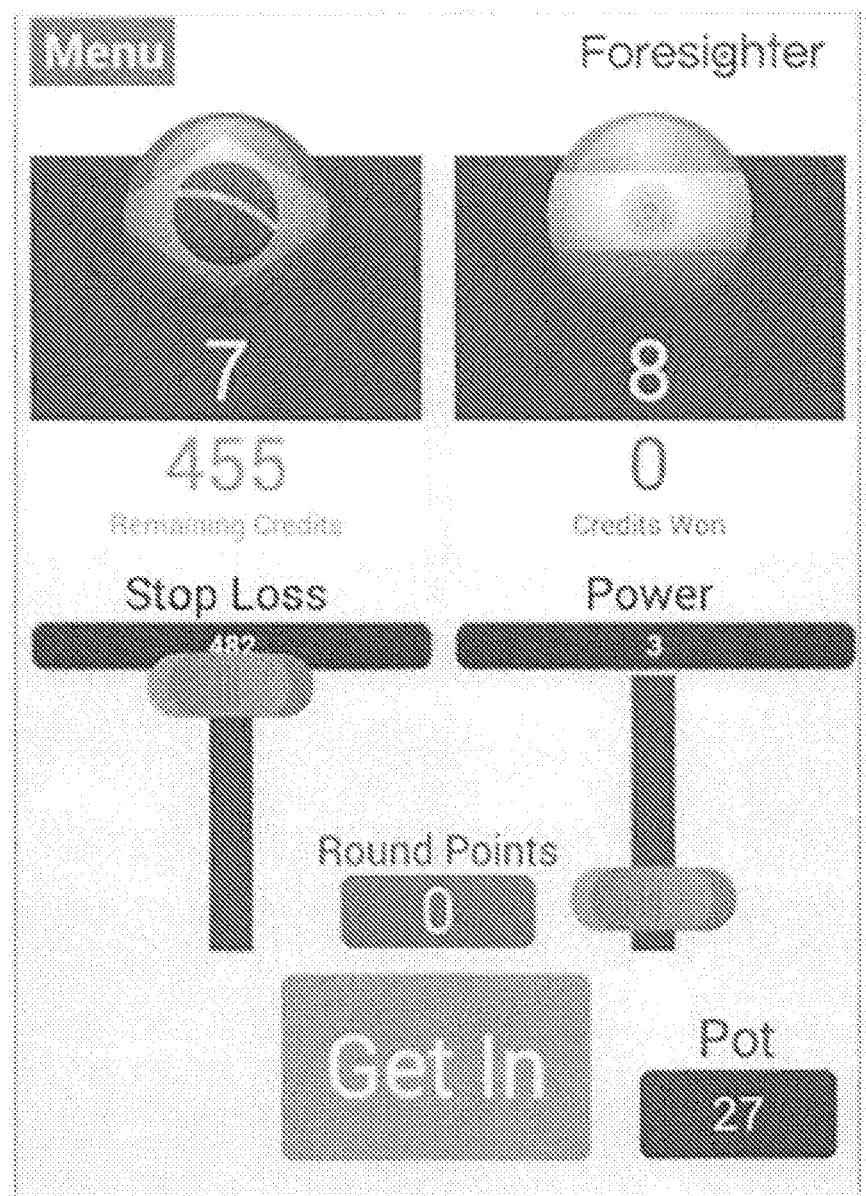
Figure 2:
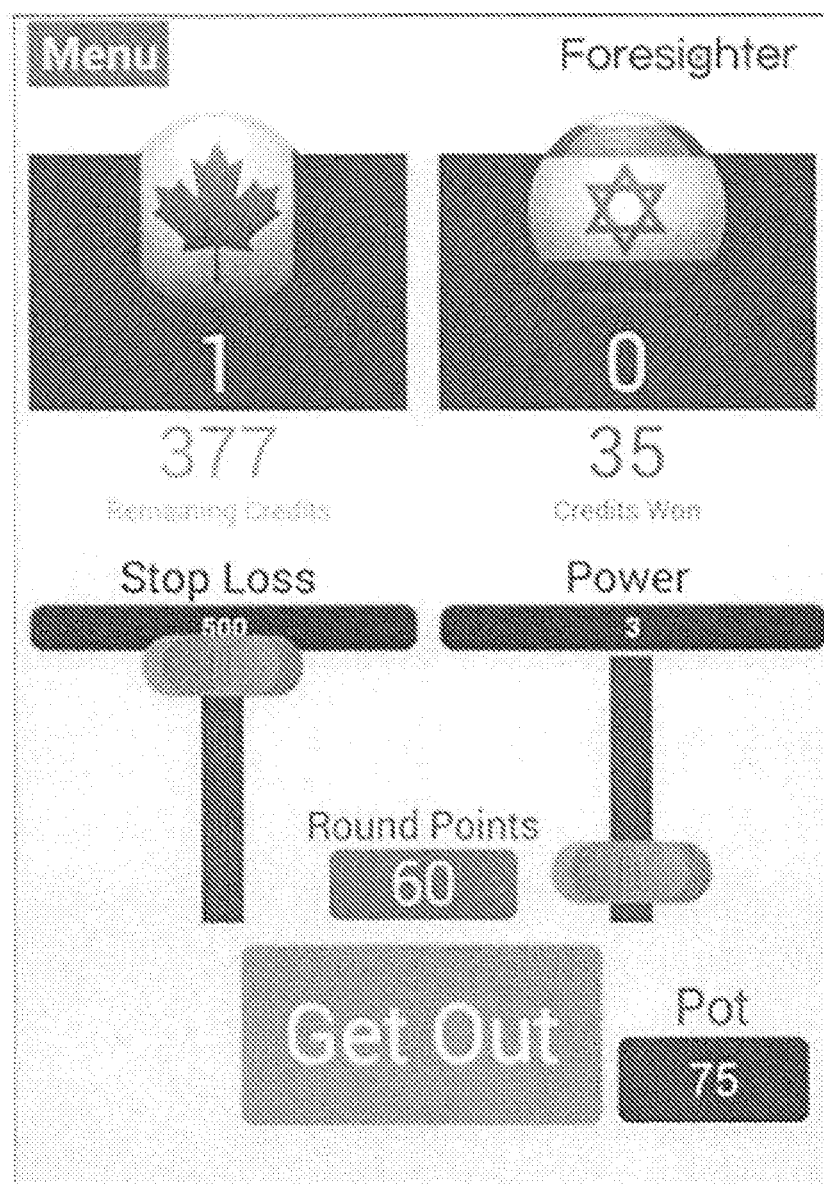
Figure 3:
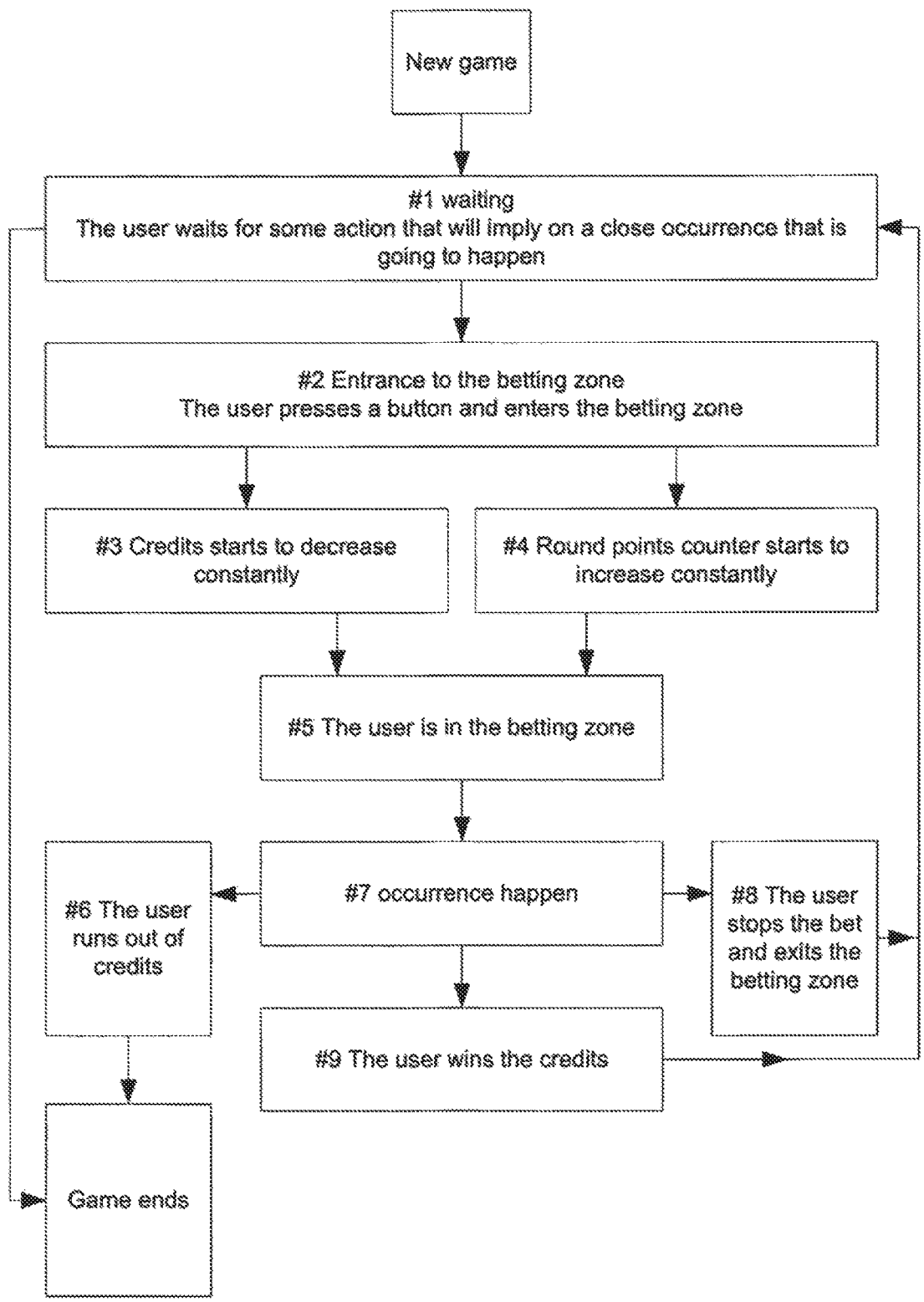

Drawing #2 presents a Smartphone implementation for soccer, when a user already pressed "Get In" and he is in the betting zone. The round point's counter increases constantly (stands on 60), and the credits counter decreases constantly (stands on 377). In the pot there are 75 credits, so if an occurrence will happen in that particular moment all the winning users are going to split those 75 credits, and the users with more time credits will win a bigger share. The user can either wait for an occurrence to happen or press "Get Out" in order to stop the credits' decrement and leave the betting zone.

Drawing #3—Flow Chart

Drawing #3 presents a flow chart of the whole process.

1—The user waits for something that could indicate that an occurrence is going to happen.

2—The user feels that the occurrence is close and presses the button to enter the betting zone. When pressing, a message is sent to the server with the client's details.

3 and #4—When receiving the accept notification from the server, two things happen on the client's device simultaneously: the round points counter starts to increase and a the remaining credits starts to decrease.

5—The user is now in the betting zone.

There are three ways to leave the betting zone:
  a. #6—When the client's remaining credits are finished—he will leave the betting zone automatically.
  b. #7—When the occurrence happens—the server sends a message to the clients that the occurrence has happened, and mentions the amount of credits earned and the new amount of remaining credits.
  c. #8—When the user believes that the chances for an occurrence to happen are lower and he presses a button to leave the betting zone. A message is being sent to the server, and the server calculates and sends back the amount of the user's remaining credits.

The invention claimed is:

1. A method of betting on at least one predefined occurrence during a live event, said method comprising the following steps:
  entering by a user having an amount of credits at least one betting zone using a graphical user interface running on a user's electronic communication device, each one of said at least one betting zone is related to one of said at least one predefined occurrence;
  sending by said user's electronic communication device an entry message to a system server communicating with said user's electronic communication device;
  activating a credits counter which constantly decreases said user's amount of credits;
  activating for each one of said at least one betting zone a round points counter;
  increasing said round points counter of each one of said at least one betting zone while said user is in said at least one betting zone;
  performing by said server, for each one of said at least one betting zones, the steps of:
    a. accumulating relative amount of credits out of said decreased amount of credits in a betting zone credits-pot;
    b. if said betting zone's related occurrence has not happened and the user still has credits repeating step (a); and
    c. if said betting zone's related occurrence has happened, sending by said server said occurrence details to said user's electronic communication device and calculating a share of said betting zone credits-pot for said user according to said corresponding round points counter;
  wherein said user may leave each one of said at least one betting zones when still having credits; and
  wherein said user is automatically made to leave said at least one betting zone if he has no more credits.

2. The method of claim 1, wherein said electronic communication device is selected from the group consisting of smartphone and tablet.

3. The method of claim 1, wherein said occurrence is selected from the group consisting of goal, corner and basket.

4. The method of claim 1, further comprising before entering by said user a betting zone, determining a power value.

5. The method of claim 4, wherein said power value determines a credits decreasing rate and a round points counter increasing rate.

6. The method of claim 5, wherein the faster said round points counter increasing rate the faster said credits decreasing rate.

7. The method of claim 1, wherein said at least one betting zone comprises a plurality of betting zones.

8. The method of claim 7, wherein each one of said plurality of betting zones comprises a different occurrence.

9. The method of claim 8, wherein said entering at least one betting zone comprises entering a plurality of betting zones.

10. The method of claim 1, wherein said entering at least one betting zone comprises entering a room within one of said at least one betting zones, said room having a separate credits-pots.

11. The method of claim 1, wherein said share of credits-pots cannot be used during said live event.

12. The method of claim 1, wherein at least one of said at least one betting zones is related to a specific player.

13. The method of claim 12, wherein at least one of said player-related betting zones comprises a different credits decreasing rate.

14. The method of claim 1, wherein at least one of said at least one betting zones is related to a specific player.

15. The method of claim 14, wherein at least one of said player-related betting zones comprises at least one of a different credits decreasing rate and a different counter increasing rate.

16. The method of claim 1, further comprising determining by the user a limited credit amount before entering said at least one betting zone.

17. A system for betting during a live event, said system comprising:
  a plurality of user's electronic communication devices running a user application comprising a graphical user interface; and
  a system server configured to communicate with said plurality of electronic communication devices
  said system server configured to receive an entry message upon entrance of a user of one of said plurality of user's electronic communication devices to at least one betting zone, each of said at least one betting zone is related to an occurrence, said user having an amount of credits;
  said system further configured to send a message back to said electronic communication device which activates a credits counter, said credits counter configured to constantly decrease said user credits while said user is in said at least one betting zone;
  for each betting zone that the user is currently in, said system is further configured to accumulate relative amount of credits out of said decreased amount of credits in a credits-pot of said betting zone;
  said system further comprising a round points counter for each of said at least one betting zone; each of said at least one round points counter is configured to increase while said user is in said corresponding at least one betting zone; and when one of said at least one occurrence has happened said server is configured to send said occurrence details to said electronic communication device and calculate a share of the relevant credits pot for said user according to said corresponding round points counter.

18. The system of claim 17, wherein said electronic communication device is selected from the group consisting of smartphone and tablet.

19. The system of claim 17, wherein said occurrence is selected from the group consisting of goal, corner and basket.

20. The system of claim 17, wherein further configured to enable said user to determine a power value.

21. The system of claim 20, wherein said power value is configured to determine a credits decreasing rate and a round points counter increasing rate.

22. The system of claim 21, wherein the faster said round points counter increasing rate the faster said credits decreasing rate.

23. The system of claim 17, wherein said at least one betting zone comprises a plurality of betting zones.

24. The system of claim 23, wherein each one of said plurality of betting zones comprises a different occurrence.

25. The system of claim 17, further comprising a room having a separate credits-pots.

26. The system of claim 17, wherein said share of credits-pots cannot be used during said live event.

27. The system of claim 17, wherein at least one of said at least one betting zones is related to a specific player.

28. The system of claim 27, wherein at least one of said player-related betting zones comprises a different credits decreasing rate.

29. The system of claim 17, wherein at least one of said at least one betting zones is related to a specific player.

30. The system of claim 29, wherein at least one of said player-related betting zones comprises at least one of a different credits decreasing rate and a different counter increasing rate.

31. The system of claim 17, further comprising determining by the user a limited credit amount before entering said at least one betting zone.

* * * * *